United States Patent
Kobayashi et al.

(10) Patent No.: US 6,509,119 B1
(45) Date of Patent: Jan. 21, 2003

(54) CARBON ELECTRODE MATERIAL FOR A VANADIUM-BASED REDOX-FLOW BATTERY

(75) Inventors: Masaru Kobayashi, Ohtsu (JP); Makoto Inoue, Ohtsu (JP); Satoshi Takase, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 72 days.

(21) Appl. No.: 09/590,629

(22) Filed: Jun. 8, 2000

(30) Foreign Application Priority Data

Jun. 11, 1999 (JP) .......................................... 11-165498

(51) Int. Cl.[7] ................................................ H01M 4/58
(52) U.S. Cl. ..................... 429/231.8; 429/105; 429/233; 423/445 R
(58) Field of Search .............................. 429/105, 231.8, 429/233; 423/445 R

(56) References Cited

U.S. PATENT DOCUMENTS

| | | | |
|---|---|---|---|
| 4,496,637 A | 1/1985 | Shimada et al. | ............... 429/44 |
| 4,816,289 A | 3/1989 | Komatsu et al. | |
| 5,648,184 A | 7/1997 | Inoue et al. | ................ 429/105 |

FOREIGN PATENT DOCUMENTS

| | | |
|---|---|---|
| EP | 0 279 687 A2 | 8/1988 |
| EP | 0 378 007 A2 | 7/1990 |
| EP | 0 426 438 A2 | 5/1991 |
| JP | 60-232669 | 11/1985 |
| JP | 05-234612 | 9/1993 |
| JP | 11-260377 | 9/1999 |

OTHER PUBLICATIONS

Patent Abstracts of Japan, vol. 011, No. 069 (C–407) (Mar. 3, 1987) [JP 61 225325 A (Oct. 7, 1986)].
Patent Abstracts of Japan, vol. 1988, No. 14 (Dec. 31, 1988) [JP 10 245213 A (Sep. 14, 1998)].
Patent Abstracts of Japan, vol. 008, No. 239 (E–276) (Nov. 2, 1984) [JP 59 119680 A (Jul. 10, 1984)].
Patent Abstracts of Japan, vol. 013, No. 213 (E–759) (May 18, 1989) [JP 01 027163 A (Jan. 30, 1989)].
Patent Abstracts of Japan, vol. 1996, No. 05 (May 31, 1996) [JP 08 007913 A (Jan. 12, 1996)].
Database WPI, Section Ch, Week 198839, Dewert Publications Ltd., London, GB, Class A60, AN 1988–276093, XP–002181409 [JP 63 203870 A (Aug. 23, 1988)].
HCAPLUS AN–1998: 791765, XP–002184536 (1998) [Sato et al., "Raman Spectra and Rate Capability of Graphite Anode for Lithium Ion Battery," *Denki Kagaku Oyobi Kogyo Batsuri Kagaku*, 66 (12), 1253–1259 (1998)].
HCAPLUS AN–1997: 753021, XP–002184537 (1997) [Wang et al., "Characterizations of Crystalline Structure and Electrical Properties of Pyrolyzed Polyfurfury Alcohol," *J. Appl. Phys.*, 82 (11), 5705–5710 (1997)].

*Primary Examiner*—Laura Weiner
(74) *Attorney, Agent, or Firm*—Leydig, Voit & Mayer, Ltd.

(57) ABSTRACT

The carbon electrode material of the present invention is used for a vanadium redox-flow cell. The carbon electrode material has quasi-graphite crystal structure in which <002> spacing obtained by X-ray wide angle analysis is 3.43 to 3.60 Å, size of a crystallite in c axial direction is 15 to 33 Å and size of crystallite in a axial direction is 30 to 70 Å. In addition, an amount of surface acidic functional groups obtained by XPS surface analysis is 0.1 to 1.2% and total number of surface bound-nitrogen atoms is 5% or smaller relative to total number of surface carbon atoms. The carbon electrode materials formed of a non-woven fabric of a carbonaceouss fiber is preferable.

14 Claims, 4 Drawing Sheets

CARBON ELECTRODE MATERIAL FOR A VANADIUM-BASED REDOX-FLOW BATTERY

BACKGROUND OF THE INVENTION

1. Field of the Invention

The present invention relates to a carbon electrode material used for a vanadium-based redox-flow type battery and, more particularly to, such a carbon electrode material which is excellent in the energy efficiency of the overall battery system and also which has less changes in its performance accompanied by a prolonged period of services.

2. Description of the Related Art

Conventionally, the electrode has been developed intensively as a key factor of the battery performance. Some types of electrodes do not act as an active material but act as a reaction field which promotes the electrochemical reaction of active materials, often coming in of carbon materials due to their good electro-conductivity and chemical resistance. In particular, as redox-flow type battery electrodes which have been developed popularly for power storing purposes, a carbon fiber assembly having a chemical resistance, electro-conductivity, and liquid flowability is us ed.

The redox-flow type battery has been changed from a type using an aqueous solution of iron and hydrochloric acid in its positive electrode and an aqueous solution of chromium and hydrochloric acid in negative to a type using in both electrodes an aqueous solution of vanadium sulfate having a higher electromotive force and thus improved to have a higher energy density. It is recently having a further enhanced energy density by the development for a higher concentration of active materials employed therein.

The redox-flow type battery mainly comprises, as shown in FIG. 1, external tanks 6 and 7 for storing an electrolyte solution and an electrolytic cell EC, in such a configuration that while pumps 8 and 9 are sending the electrolyte solution containing an active material from the external tanks 6 and 7 to the electrolytic cell EC, electrodes incorporated in the electrolytic cell EC performs electrochemical conversion, i.e. charge-discharge.

In charge-discharge in general, the electrolytic cell has such a liquid flow-through type structure as shown in FIG. 1, in order to circulate an electrolyte solution between the external tanks and the electrolytic cell itself. Such a liquid flow-through type electrolytic cell is called a single cell and used, as a minimum unit, independently or in a multi-layer stack. Since the electrochemical reaction within a liquid flow-through type electrolytic cell occurs as a non-uniform phase reaction on the surface of an electrode, it is generally accompanied by a two-dimensional electrolytic-reaction field. Since its electrolytic-reaction field is a two-dimensional one, the electrolytic cell suffers a problem that it has a smaller reaction amount per unit volume.

Therefore, the electrochemical reaction field has been three-dimentionalized in order to increase a reaction amount, i.e. current density per unit area. FIG. 2 shows an exploded perspective view of a liquid flow-through type electrolytic cell having three-dimensional electrodes. In this electrolytic cell, between counter-opposing two collector plates 1 an ion exchange membrane 3 is interposed, flow passages 4a and 4b for an electrolyte solution along the inner surface of the collector plates 1 are formed by a spacer 2. At least one of these flow passages 4a and 4b has therein an electrode material 5 such as a carbon fiber assembly, thus constituting a three-dimensional electrode. Note here that the collector plate 1 is provided with a liquid inlet 10 and a liquid outlet 11 for the electrolyte solution.

In the case of a redox-flow type battery using vanadium oxysulfate as its positive-electrode electrolyte solution and vanadium sulfate as its negative-electrode electrolyte solution, at the time of discharge, the solution containing $V^{2+}$ is supplied to the liquid flow passage 4a at the negative electrode and the electrolyte solution containing $V^{5+}$ (actually an ion containing oxygen) is supplied to the flow passage 4b at the positive electrode. At the flow passage 4a of the negative electrode, in the three-dimensional electrode 5, $V^{2+}$ releases electrons, to be oxidized into $V^{3+}$. These released electrons pass through an external circuit and reduces, within the three-dimensional electrode of the positive electrode, $V^{5+}$ into $V^{4+}$ (actually ions containing oxygen). As this oxidation-reduction reaction goes on, the electrolyte solution at the negative electrode runs short of $SO_4^{2-}$ and that at the positive electrode has an excessive amount of $SO_4^{2-}$, so that $SO_4^{2-}$ moves from the positive electrode through the ion-exchange membrane to the negative electrode, thus maintaining a charge balance. Or $H^+$ moves from the positive electrode through the ion-exchange membrane to the negative electrode, thus maintaining the charge balance. At the time of charge, the reaction opposite to that for discharge proceeds.

The electrode materials for vanadium-based redox-flow type batteries must have the following performance as their properties:

1) No side reactions occurring other than desired reactions (high reaction selectivity), specifically, high current efficiency ($\eta I$).
2) High activity, specifically, small cell resistance. That is, high voltage efficiency ($\eta v$).
3) High battery energy efficiency ($\eta E$) related to the above-mentioned items 1) and 2).

$$\eta_E = \eta I \times \eta v$$

4) Less deterioration against repetitive use (prolonged service life), specifically, less deterioration of battery energy efficiency ($\eta E$).

Japanese Patent Publication No. Sho-60-232669, for example, suggests that a carbonaceous material should be used as an electrode material for ion-chromium-based redox-flow type batteries, which has an quasi-graphite microcrystal having an average of 3.70 Å or less of a <002> inter-facial spacing obtained with X-ray wide-angle analysis and an average of 9.0 Å or more of a c-axial crystallite size and also that has a total acid functional group amount of at least 0.01 meq/g.

Japanese Patent Publication No. Hei-5-234612 also suggests that carbonaceous fiber made from polyacrylonitrile-based fiber as a material should be used as an electrode material for an electrolytic cell of iron-chromium-based redox-flow type batteries, which has an quasi-graphite crystal structure with a <002> inter-facial spacing of 3.50–3.60 Å as obtained with X-ray wide-angle analysis, and in which the number of the combination oxygen atoms is 10–25% of that of the carbon atoms on the surface.

By Japanese Patent Publication Nos. Sho-60-232669 and Hei-5-234612, however, to effectuate proper wettability between the carbonaceous material surface and the electrolyte solution, the total acid functional group amount must be 0.01 meq/g or more or the number of the combination oxygen atoms must be 10% or more of that of the carbon atoms on the carbonaceous material surface. Therefore, as found out recently, a vanadium-based redox-flow type battery presently under development having a higher active material concentration and also a higher viscosity provides a higher contact resistance between the carbonaceous material surface and the collector plate or that between the fiber and the fiber, resulting in the cell resistance being too high to obtain a high energy efficiency.

Moreover, it was found out that since the vanadium-based redox-flow type battery has strong oxidization force of the penta-valent ions of vanadium, the above-mentioned electrode material cannot provide sufficient oxidization resistance, so that the cell resistance increases as the charge-discharge cycle is repeated, thus increasing a change in (deterioration ratio of) the energy efficiency.

In view of the above, it is an object of the present invention to provide such an electrode material for vanadium-based redox-flow type batteries that can enhance the total efficiency of those vanadium-based redox-flow type batteries and also that improve the charge-discharge cycle service life.

It is another object of the present invention to provide a carbon electrode material that can enhance the electro-conductivity of the carbon electrode material itself and also that can inhibit the deterioration of the electro-conductivity due to a prolonged period of service.

It is still another object of the present invention to provide a carbon electrode material that can reduce the contact resistance of the carbon electrode surface and also that can maintain at a low value of the contact resistance of the carbon electrode material for a prolonged period of time.

It is still another object of the present invention to provide a carbon electrode material that can improve both the physical properties of a carbon fiber and those of a non-woven fabric, to reduce the cell resistance of a redox-flow type battery or permit smooth flow-through of the electrolyte solution within the electrolytic cell, thus enhancing the energy efficiency.

SUMMARY OF THE INVENTION

To this end, the inventors of the present invention conducted intensive study and came up with a finding for completion of the present invention that for a carbon electrode material having a particular quasi-graphite crystal structure, by regulating both a surface acid functional group amount and a number of surface bound-nitrogen atoms within their respective particular ranges, the above-mentioned objects can be achieved.

That is, any carbon electrode material for vanadium-based redox-flow type batteries according to the present invention is such a carbon electrode material for a vanadium-based redox-flow type battery, comprising quasi-graphite crystal structure, wherein <002> spacing is 3.43 to 3.60 Å, size of a crystallite in c axial direction is 15 to 33 Å, and size of a crystallite in a axial direction is 30 to 70 Å, each obtained by X-ray wide angle analysis, and having surface property obtained by XPS surface analysis wherein an amount of surface acidic functional groups is 0.1 to 1.2% relative to total number of surface carbon atoms and number of surface bound-nitrogen atoms is 5% or smaller relative to total number of surface carbon atoms. Preferably, in particular, the above-mentioned surface acid functional group amount is 0.2–1.0% of the total number of the surface carbon atoms and the above-mentioned number of the surface bound-nitrogen atoms is 3% or less of the total number of the surface carbon atoms.

In such a carbon electrode material having the above-mentioned quasi-graphite crystal structure, by regulating the surface acid functional group amount within the above-mentioned range, the vanadium-based redox-flow type battery has therein a remarkably increased degree of wettability with an electrolyte solution, an increased area of the electrode's effective area (significantly larger than the geometrical area but smaller than the BET surface area), a largely improved degree of the electrode activity, and a largely enhanced electro-conductivity of the electrode surface. This in turn decreases the cell resistance, that is, improves the voltage efficiency $\eta v$ and largely enhances the energy efficiency $\eta E$. Also, with the number of the surface bound-nitrogen atoms held in the above-mentioned range, proliferation (growing gigantically) of the functional groups because of repetition of the charge-discharge cycle can be inhibited, to also prevent deterioration of the accompanied electro-conductivity and wettability, i.e. increases in the cell resistance. With this, it is possible to reduce time-wise changes in the energy efficiency $\eta E$ during a prolonged charge-discharge cycle.

In the above case, preferably that <002> inter-facial spacing is 3.45–3.50 Å, that c-axial crystallite size is 20–30 Å, and that a-axial crystallite size is 45–65 Å. A carbon electrode material having such an quasi-graphite crystal structure has its- electro-conductivity further improved and therefore enjoys more appropriate cell resistance and energy efficiency also with less fluctuations in energy efficiency which may be caused by repetition of the charge-discharge cycle.

Preferably a carbon electrode material according to the present invention is used in a vanadium-based redox-flow type battery having its electrolyte-solution viscosity of 0.005 Pa·s or higher at 25° C. The redox-flow type battery having such an electrolyte solution tends to have a higher contact resistance between the carbonaceous material surface and the collector plate or between the fiber and the fiber, so that the carbon electrode material according to the present invention having the above-mentioned function and effects is particularly useful.

Also, preferably, the carbon electrode material according to the present invention is used in a vanadium-based redox-flow type battery wherein its electrolyte solution contains 1.5 mol/l or more of vanadium ions. Since the redox-flow type battery having such an electrolyte solution has a strong oxidization force of the vanadium's penta-valent ions, as the charge-discharge cycle is repeated, the cell resistance increases due to the oxidization of the electrode material, thus causing the energy efficiency to deteriorate. Therefore, the carbon electrode material having the above-mentioned function and effects according to the present invention is particularly useful.

DETAILED DESCRIPTION OF THE PREFERRED EMBODIMENTS

Figure 1:
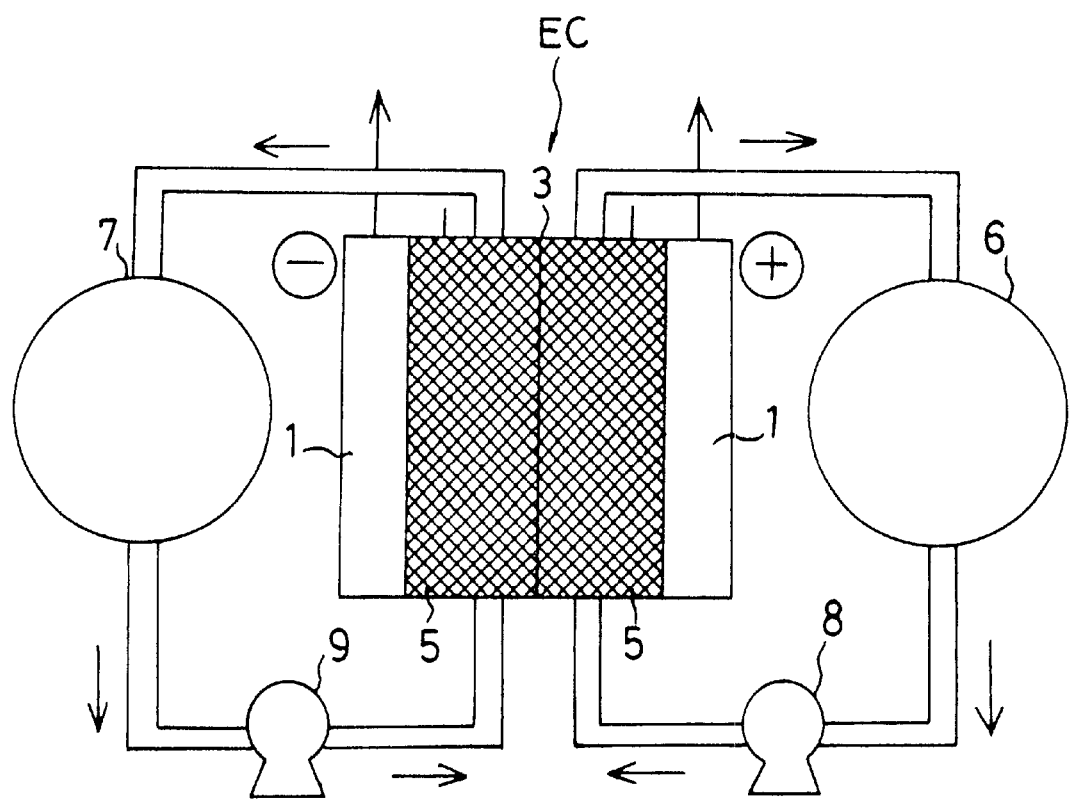
FIG. 1 is a schematic illustration of a vanadium-based redox-flow type battery.
Figure 2:
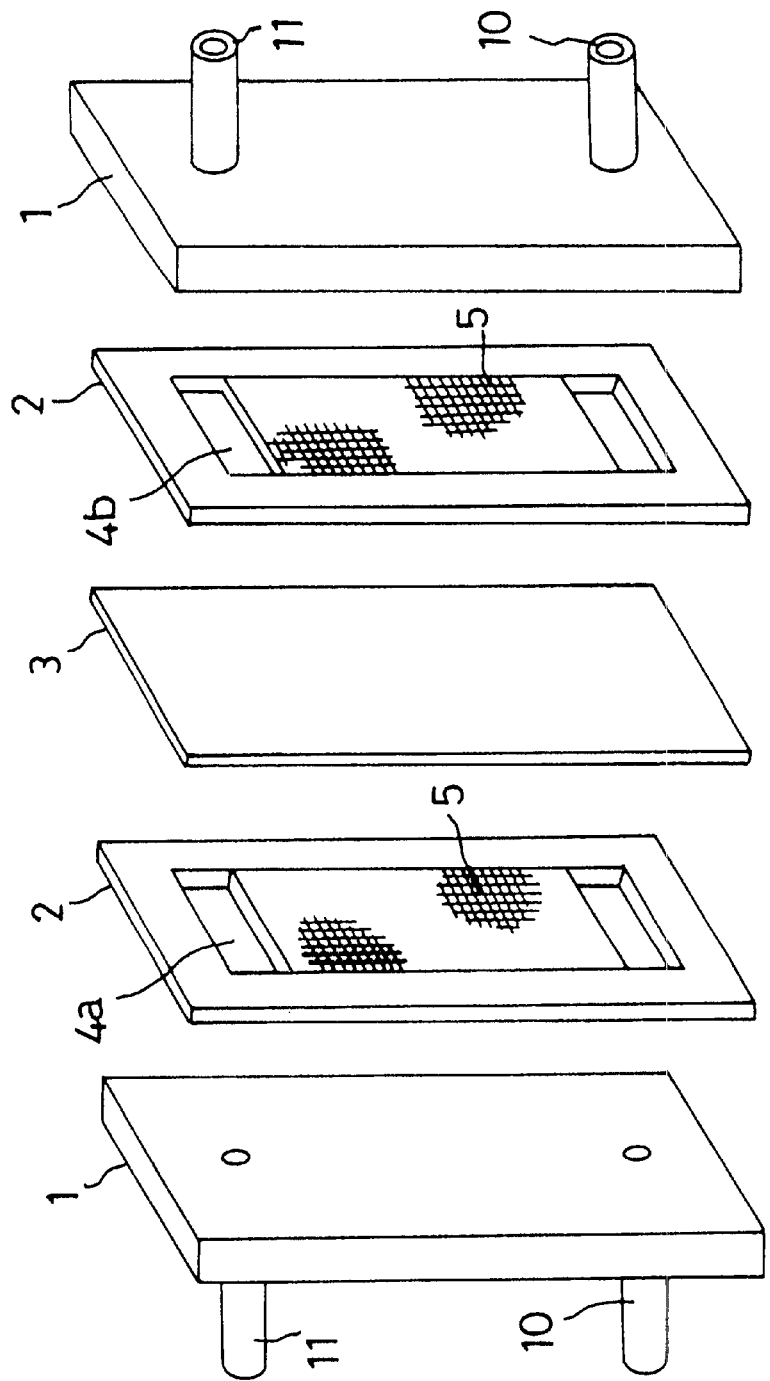
FIG. 2 is an exploded perspective view of an electrolytic cell of a vanadium-based redox-flow type battery having a three-dimensional electrode.

A carbon electrode material for vanadium-based redox-flow type batteries according to the present invention is not limited to its tissue or micro-structure but preferably can be made larger in electrode area. Specifically it may include a spun yarn, a filament bundling yarn, a non-woven yarn, a fabric, a woven fabric, a special fabric (such as disclosed in Japanese Patent Publication No. Sho-63-200467) or a carbonaceous fiber assembly consisting of their hybrid tissue or a porous carbon substance, a carbon-carbon composite, a particulate carbon material, etc. Of these, a sheet consisting of these carbonaceous fibers, particularly carbonaceous fiber's non-woven fabrics is preferable from a viewpoint of handling, workability, and manufacturability.

The non-woven fabric is appropriately made by opening a short fiber made infusible or flame resistant before baking (carbonization) and carding it to first create a web consisting of a few layers stacked and then treating it with a needle punch machine.

The basis weight of the non-woven fabric is preferably 100–1000 g/m$^2$, particularly 200–600 g/m$^2$ when it is 2–3 mm thick as sandwiched between the separator membrane and the collector plate in a filled state. Also, such a non-woven fabric that has its one face treated to have one or more a concave groove is preferably used from a viewpoint of liquid flowability. In this case, preferably the groove has a width and a depth of at least 0.3 mm, particularly preferably 0.5 mm or more. That carbonaceous fiber non-woven fabric is larger than a thickness in the above-mentioned filled state, preferably about 1.5 times the thickness in the filled state. However, if it is too thick, it would break through the separator membrane by its compressive stress, so that preferably that stress is designed to be 1 kgf/cm$^2$ or less.

Note here that the above-mentioned carbonaceous fiber has preferably an average fiber diameter of 5–20 $\mu$m and an average length of 30–100 mm. Also, the carbonaceous fiber preferably is 1.1 to 5.5 dtex.

Since the carbonaceous fiber sheet is incorporated in the battery as compressed therein, so that in the resultant gap a highly viscous electrolyte solution flows, the tensile strength is preferably 0.1 kg/cm$^2$ to avoid dropping in order to maintain the shape. Also, to improve the contact resistance with the collector plate, for a non-woven fabric tissue, the density of the filling layer sandwiched between the collector plates is preferably 0.05 g/cm$^3$ or more and the resilient strength is preferably 0.1 kgf/cm$^2$ or more.

A carbon electrode material for vanadium-based redox-flow type batteries according to the present invention needs to have a quasi-graphite crystal structure which has a <002> inter-facial spacing obtained with X-ray wide-angle analysis of 3.43–3.60 Å, a c-axial crystallite size of 15–33 Å, and an a-axial crystallite size of 30–70 Å. Preferably, the above-mentioned <002> inter-facial spacing is 3.45–3.50 Å, the above-mentioned c-axial crystallite size is 20–30 Å, and the above-mentioned a-axial crystallite size is 45–65 Å. The <002> inter-facial spacing is known to take on various values from 3.35 Å for graphite to a value in excess of 3.7 Å for amorphous carbon, having various properties dependently.

If the <002> inter-facial spacing obtained by X-ray wide-angle analysis is 3.60 Å or more or the c-axial crystallite size is 15 Å or less or the a-axial crystallite size is 30 Å or less, the electro-conducting resistance of the electrode material in the inner battery resistance (cell resistance) cannot be ignored, thus resulting in an increase in the cell resistance i.e. decrease in the voltage efficiency) to deteriorate the energy efficiency.

Also, of the <002> inter-facial spacing obtained with X-ray wide-angle analysis is 3.43 Å or less or the c-axial crystallite size of 33 Å or more or the a-axial crystallite size is 70 Å or more, the cell resistance increases as the charge-discharge cycle is repeated, thus deteriorating the energy efficiency. This is regarded because the above-mentioned carbon has distortion in its crystal structure or has a structure approximate to graphite, it tends to be decomposed due to sulfuric acid used in the electrolyte solution of, e.g., a vanadium-based redox-flow type battery.

A carbon electrode material according to the present invention preferably has 30–60 cm$^{-1}$ as its half-value, half-width of a 1360 cm$^{-1}$ peak, as obtained with laser Raman spectroscopic analysis, and 30–45 cm$^{-1}$ as its half-value, half-width of a 1580 cm$^{-1}$ peak, and also 0.7–1.0 as a ratio (=Ia/Ig) between the peak strength Ia at 1360 cm$^{-1}$ and Ig at 1580 cm$^{-1}$.

If each of the above-mentioned parameter values is larger than its upper limit, the specific resistance exceeds 10$^{-2}$ $\Omega \cdot$cm, so that the electrode material's electro-conductive resistance component in the inner battery resistance (cell resistance) cannot be ignored, thus resulting in an increase in the cell resistance (i.e. decrease in the voltage efficiency) and a decrease in the energy efficiency. Also, the specific resistance tends to be deteriorated due to a prolonged period of service.

If each of the above-mentioned parameters is smaller than its lower limit, on the other hand, the specific resistance increases over a prolonged period of service, thus resulting in an increase in the cell resistance and a decrease in the energy efficiency. This is regarded because the above-mentioned carbon electrode material has distortion in its crystal structure or has a structure approximate to graphite, so that it tends to be decomposed due to sulfuric acid used in the electrolyte solution of, e.g., a vanadium-based redox-flow type battery.

Although the above-mentioned parameters may be controlled by the baking conditions, they can be also appropriately controlled without influenced by thew baking conditions too much by uniformly attaching metal salt which provide such tri-valent ions such as Al, Si, and Bi as much as 10–100 ppm as referred to metal ions to a carbon fiber material which has undergone initial air-oxidation, and by then baking (carbonizing) it.

Note here that in laser Raman spectroscopic analysis, a microscopic Raman spectrometer (manufactured by Jobanne-Yvonne Atago-Bussan) to scan from 1800–1000 cm$^{-1}$ with 488 nm Ar ion laser to analyze a peak Ia of 1360±20 cm$^{-1}$ and a peak Ig of 1580±20 cm$^{-1}$. The peak strengths are both subjected to base-line correction and then the measured wavelength is approximated with a Lorenz function; with this, they are calculated based on the highest point and the peak's half-value, half-width is obtained based on a half value of a peak width at a half of the peak strength.

Also, the carbon electrode material according to the present invention preferably has a quasi-graphite crystal structure that has 0.50–0.90 as the stacked structure ratio based on a peak strength of the <002> diffraction obtained with X-ray wide-angle analysis. If the stacked structure ratio is less than 0.50, the specific resistance exceeds 10$^{-2}$ $\Omega \cdot$cm, so that the electrode material's electro-conductive resistance component of the inner battery resistance (cell resistance) cannot be ignored, thus resulting in an increase in the cell resistance i.e. decrease in the voltage efficiency) and a decrease in the energy efficiency. If the stacked structure ratio exceeds 0.90, on the other hand, it may be difficult to introduce a sufficient amount the of surface acid functional group at the time of surface oxidation processing, and the stacked structure tends to be destroyed due to distortion of the inner structure.

The above-mentioned stacked structure ratio can be appropriately obtained by using such a material having a high orientation as meso-phase pitch or polyparaphenylene benzobisoxasol (PBO) and baking (carbonizing) it at 1300–1800° C. for five hours or more.

The surface acid functional group amount of the carbon electrode material according to the present invention obtained with XPS surface analysis is 0.1% or more, preferably 0.2% or more of the total number of the surface carbon atoms. If the surface acid functional group amount is too small, the electrolyte solution has poor wettability, thus remarkably increasing the cell resistance. This is regarded because since the carbon atom itself is hydrophobic, when there is present fewer acid functional groups which are hydrophilic, water is repelled. Also, the surface acid functional group amount is 1.2% or less, preferably 1.0% or less of the total number of the surface carbon atoms. If the surface acid functional group amount is too much, the electro-conductivity of the surface is decreased by the functional groups, thus deteriorating the contact resistance between the collector plates or that between the fabrics and remarkably increasing the cell resistance.

Note here that the above-mentioned surface acid functional group amount refers to an amount of hydroxide or carboxyl groups of the contained oxygen function groups that can be replaced with silver ions by silver-nitrate processing and is expressed as a ratio of a surface silver ion amount detected by XPS surface analysis as against the number of the surface carbon atoms.

Also, in the carbon electrode material according to the present invention, the number of the surface bound-nitrogen atoms obtained by XPS surface analysis is 5% or less, preferably 0.2–3.0%, more preferably 0.5–2.0% of the total number of the surface carbon atoms. If the surface bound-nitrogen atoms are too many, the cell resistance increases as the charge-discharge cycle is repeated, thus increasing the cell resistance and deteriorating the energy efficiency. This is regarded because the functional groups having carbon bound to nitrogen tend to attract sulfuric acid ions in the electrolyte solution, to form large functional groups on the surface by the electrochemical force during charge-discharge, thus deteriorating the surface electro-conductivity and the wettability with the electrolyte solution.

Moreover, in the carbon electrode material according to the present invention, the number of the surface carbon atoms double-bound with nitrogen is preferably 0.3–3.0% of the total number of the surface carbon atoms. If the number of the surface carbon atoms double-bound with nitrogen is less than 0.3%, the nitrogen in the carbon drops to increase the crystal orientation of the carbonaceous fiber and improve the electro-conductivity of the fiber itself, but the flexural strength of the fiber is deteriorated and also the cell is mounted to destroy the fiber, so that the necessary compressive stress cannot be maintained, thus deteriorating the contact pressure force for e.g. short fabrics and increasing the contact resistance time-wise. If it exceeds 3%, on the other hand, the double-bound nitrogen binds time-wise with an impurity in the system during electrification, to form groups containing ammonium salt, which groups problematically deteriorate the inter-fiber contact of the electrode material and the electro-conductivity between the fiber and the collector plate. Note here that the ratio of the surface carbon atoms double-bound with nitrogen can be obtained by C1s-peak separation measured by XPS surface analysis.

Also, depending on how to process the surface of the carbon electrode material, the quaternary nitrogen may be formed on the carbon surface. This is regarded because under the presence of an acid etc., the nitrogen atoms in carbon combine with the acid to form tetra-ammonium salt, so that the resultant group may deteriorate the inter-fiber contact of the electrode material and the electro-conductivity between the fiber and the collector plate. Therefore, the presence of such quaternary nitrogen is preferably controlled down to 0.1%, more preferably 0.8% or less of the total number of the surface carbon atoms. Note here that the ratio of the quaternary nitrogen as against the total number of the surface carbon atoms can be obtained by peak separation of both the C1s peak and the N1s peak measured by XPS surface analysis.

Also, in the carbon electrode material according to the present invention, the number of the surface neutral carbon atoms is preferably 80–95% of the total number of the surface carbon atoms. If the number of the surface neutral carbon atoms is less than 80%, a variety of many functional groups are bound with carbon, to deteriorate the inter-fiber contact of the electrode material and the electro-conductivity between the fiber and the collector plate, thus tending to increase the contact resistance. If there are many non-acid functional groups in each of the functional groups, the acid functional groups are time-wise deteriorated in action, to deteriorate the inter-fiber contact and the electro-conductivity between the fiber and the collector plate, thus tending to increase the time-wise resistance change ratio. If it is larger than 95%, the flexural strength of the fiber is lowered, so that when the cell is mounted, the fiber is destroyed to disable the maintaining of necessary compressive stress, thus tending to increase the contact resistance time-wise. The ratio of the number of the surface neutral carbon atoms as against the total number of the surface carbon atoms can be obtained by separation of a C1s peak measured by XPS surface analysis.

A carbonaceous material having the above-mentioned excellent internal structure and the wettability can be obtained by baking (carbonizing) a material, such as a polyacrylonitrile, isotropic pitch, meso-phase pitch, cellulose, or phenol, or polyparaphenylene benzobisoxsasol (PBO) which has undergone initial air-oxidation under stress at 200–300° C., in an inactive gas (or nitrogen gas) atmosphere at 1000–1800° C. to obtain a carbon material having a quasi-graphite crystal structure and then subjecting it to the dried oxidization processing. In this process, it was found that, in particular, by baking the material in such an atmosphere that the concentration of an inactive gas such as argon becomes 90% or more even in the vicinity of a processing subject, the carbon crystal structure is promoted in growth. This reaction mechanism, under study presently though, is assumed that since highly reactive resolved gases such as HCN, $NH_3$, and CO are generated during a temperature rise, the surface modification is suppressed by these resolved gases. Such an atmosphere that the inactive gas concentration becomes 90% or more even in the vicinity of a processing subject can be obtained by, e.g., constantly spraying an inactive gas by as much as 1 cc/m or more per 1 g.

Since the carbon material which has undergone a temperature rise in such an atmosphere can be obtained even at a lower baking temperature than a conventional carbon material which has undergone a long period of temperature rise, it has high crystallinity and better wettability, i.e. improvements in both the electro-conductivity and the electrode activity compared with a conventional one having similar crystallinity. This is because surface property tends to depend on the baking temperature, i.e. with a higher baking temperature, it becomes difficult to introduce the acid functional groups.

The dried oxidization processing for such a carbon material is conducted in such a gas atmosphere of 1–10% of oxygen concentration as to provide a range of 90–99%, preferably 93–99% of weight yield. The processing temperature is preferably 500–900° C., more preferably 650–750° C. The processing method is not limited it but for example electrolytic oxidization may be conducted instead, to obtain almost the same effects In the above-mentioned manufacturing method, the <002> inter-facial spacing the a-axial and c-axial crystallite sizes can be controlled by adjusting mainly the baking (carbonization) temperature; the temperature-rise speed, and the time lapse. Also, although it depends on the crystallinity (crystal growing degree) of the quasi-graphite crystal structure, the surface acid functional group amount can be controlled by adjusting the oxygen concentration upon dried oxidization process. Although it depends on the crystallinity of the quasi-graphite crystal structure, number of surface bound-nitrogen atoms can be controlled by adjusting the nitrogen contents of a material used and the temperature of the dried oxidization process.

Preferably, a carbon material according to the present invention is formed as a non-woven fabric of a carbonaceous fiber and, the non-woven fabric has a compressibility of 10–25% and a compression modulus of 80% or more and preferably a compressibility of 10–20% and compression modulus of 82% or more. If the compressibility is less than 10%, inter-fiber entanglement cannot be obtained, thus being difficult to maintain a shape as a carbonaceous fiber's non-woven fabric. If the compressibility exceeds 25% or the compression modulus is less than 80%, the collector plate has a higher contact resistance when incorporated in a battery as abutted therein, to result in a increase in the cell resistance (decrease in the voltage efficiency), so that the energy efficiency tends to be deteriorated.

The compressibility and the compression modulus of the above-mentioned non-woven fabric is measure as follows. According to "6.18 Compressibility and Compression Modulus" written in JIS L1096 (1990), five specimen measuring about 5×5 cm² each are prepared to measure the thickness (unit: mm) of each of them under an initial load of 0.49 kPa and then measure the thickness (unit: mm) after being left under a load of 24.5 kPa for one minute. Next, the load is removed, to leave them for one minute and then they are measured for thickness under the initial load, to obtain the compressibility and the compression modulus based on these thickness, thus averaging the five thickness values to an integral place.

The compression properties of the above-mentioned non-woven fabric, which need a premise of having the above-mentioned carbon crystal structure and the surface acid functional groups, can be obtained by controlling the conditions of needle punching as a pre-stage. That is, to improve the contact-ness (contact force and contact surface) of the non-woven fabric with the collector plate as abutted therein, preferably while holding its flexible shape with no dropping of fibers, the needle punching density is held at 150–300 pieces/cm², preferably 200–300 pieces/cm² and the needle punching needle comes in such as that provides facility in entanglement of infusible fabrics or flame resistant fabrics, e.g. SB#36 or SB#40 (by Foster Needle).

Also, to regulate the compressibility and the compression modulus of the non-woven fabric in the above-mentioned range, preferably the dried oxidation processing is conducted under tension with a width of 0.01 kgf/cm width or larger.

Also, preferably, a non-woven fabric according to the present invention has a bulk density of 0.05–0.17 g/cm³, more preferably 0.055–0.165 g/cm³. If the bulk density is less than 0.05 g/cm³, the liquid flow pressure loss tends to decrease but, when the cell is mounted, the compression stress is decreased, so that the cell resistance tends to rise. If the bulk density exceeds 0.17 g/cm³, on the other hand, the liquid flow pressure loss tend to rise to increase the liquid delivery pump loss, thus deteriorating the total battery efficiency. This bulk density can be obtained by the following equation:

Bulk density (g/cm³)=basis weight of carbonaceous fiber non-woven fabric (g/m²)/thickness (mm)/1000

When for example a needle punching method is employed as a pre-stage, to obtain the above-mentioned predetermined bulk density, such s property as relating to the bulk density of the carbonaceous fiber non-woven fabric must be optimized including conditions of the needle punching method for non-woven fabrics such as the properties, needle density, needle depth, and pressing gap for needle punching needles while forming non-weaving the fabric. When employing No. 40 triangular needles (by Foster, HDB) with a barb spacing of 1.3 mm as needle punching needles using as a raw fiber material the polyacrylonitrile (fiber diameter: 16 $\mu$m, fiber length: 80 mm) which has undergone initial air-oxidization, preferably the needle density is 278 pieces/inch², the depth is 4–8 mm, and the pressing gap is 4 mm or less.

Moreover, to provide such a high density as not to be achieved by the needle punching method, thermal pressing can be conducted or thermal crimping can be conducted under the presence of a binder. Generally, to improve the bulk density for non-woven fabrics, such a method is employed as to enhance the density of needle punching needles, but preferably, when thermal pressing or thermal crimping by use of a binder is conducted, needle punching is performed with such a needle density as to hold the shape of the non-woven fabric and then thermal pressing or thermal crimping by use of a binder is performed. When conducting thermal pressing, although the temperature and the pressure must be adjusted depending on the properties of each fiber, generally, preferably it is conducted at a pressing temperature of 100–240° C. and a cotton pressure of 6–60 kg/cm². Also, when using a binder, although it may come in various types such as acrylic type, starch type, polyvinyl alcohol type, epoxy resin type, vinyl acetate type, phenol resin type, etc. without limits, in order to maintain adhesiveness even after carbonization, most preferably a phenol resin-based binder is used. Also, although the method for adding the binder to a non-woven fabric may come in a method of adding it during fiber mixing after a raw fiber material is opened, a method of solving or scattering it into an organic solvent and attaching it to a non-woven fabric to dry it, and a method of scattering a powder binder into the air and attaching it to the non-woven fabric surface, it is not limited to these but only needs to be conducted under appropriate conditions for each material.

Next, various methods, according to the present invention, of measuring a <002> inter-facial spacing (d002), a c-axial crystallite size (Lc), an a-axial crystallite size (La), XPS surface analysis, a current efficiency, a voltage efficiency (cell resistance R), and time-wise changes in the energy efficiency after the charge-discharge cycles.

(1) <002> Inter-facial Spacing (d002), Crystallite size (Lc), and (La)

An electrode material is crushed to about a particle diameter of 10 μm in an agate mortar, to mix as an internal standard substance an about 5-weight % of X-ray standard high-purity silicon power against a specimen and put it into a cell, to measure an wide-angle X-ray with a diffraction meter method using CuKα ray as a ray source.

A curve is corrected not in terms of so-called the Lorenz factor, the polarization factor, the absorption factor, the atom-scattering factor, etc. but done so using a following simple method. That is, from a-base-line of a peak which corresponds to a <002> diffraction, an effective strength is re-plotted, to obtain a <002> corrected strength curve. An intermediate point of a line segment at which as a line parallel to an angular axis drawn at a ⅔ height of a peak height of this curve intersects with the corrected strength curve is obtained and its angle is corrected with reference to an internal standard to provide a value twice as large as the diffraction angle, thereby obtaining a <002> inter-facial spacing based on a wavelength λ of the CuKα using the Bragg Equation of Equation 1.

$$d_{002} = \frac{\lambda}{2 \cdot \sin\theta} \text{ (Å)} \quad \text{(Equation 1)}$$

where the wavelength λ is 1.5418 Å and θ indicates the <002> diffraction angle.

Next, a length (half-value β) of a line segment at which a line parallel to an angular axis drawn at a ½ height of the peak height intersects with the corrected strength curve is used to obtain the c-axial crystallite size Lc according to Equation 2.

$$Lc = \frac{k1 \cdot \lambda}{\beta \cdot \cos\theta} \text{ (Å)} \quad \text{(Equation 2)}$$

where the wavelength λ is 1.54148 Å, the structure coefficient k1 is 0.9, θ indicates the <002> diffraction angle, and β indicates a half-value of the <002> diffraction peak.

The stacked structure ratio is obtained on the basis of the peak strength and the base-line strength of the above-mentioned corrected curve <002> diffraction. Specifically, based on the peak strength $I_m$ of the <002> diffraction and average base-line strength $I_n$ of the peak of the <002> diffraction, a relative strength SI (=$(I_m-I_n)/I_m$) and, based on as well as the strength $I_{sp}$ (=0.0606×$d_{002}$×Lc) not including the <002> diffraction peak background, the stacked structure ratio Ps (=SI/(SI (1-$I_{sp}$)+$I_{sp}$)) (or details, see Japan Chemistry Institute, by Shiraishi et al., (1), p.153, 1976).

Also, an effective strength is re-plotted from the base-line of a peak which corresponds to the <10> diffraction, to obtain a corrected strength curve. Based on a length(half-width β) of a line segment at which a line parallel to an angular axis drawn at a ½ height of the peak height intersects with the corrected strength curve, the a-axial crystallite size La is obtained using Equation 3.

$$La = \frac{k2 \cdot \lambda}{\beta \cdot \cos\theta} \text{ (Å)} \quad \text{(Equation 3)}$$

where the wavelength λ is 1.5418 Å, the structure coefficient k2 is 1.84, θ indicates the <10> diffraction angle, and β indicates the half-width of the <10> diffraction peak.

(2) XPS Surface Analysis

The apparatus used for measurement by use of the X-ray photo-electronic spectroscopy abbreviated as ESCA or XPS is actually a Shimazu ESCA750 and, for analysis an ESCAPAC760 is used.

Each specimen is immersed in an acetone solution of silver nitrate, to completely replace the proton of the acid functional groups with silver, dean it with acetone and water respectively, blank it into pieces with a 6-mm diameter, and adhere it to a heating specimen table for analysis by conducting paste. Beforehand, prior to measurement, the specimen is heated to 120° C. and removed of air in vacuum for three hours or longer. As a ray source, an MgKα-ray (1253.6eV) is used and the intra-apparatus vacuum degree is $10^{-7}$ torr.

Measurement is conducted for C1s, N1s, and Ag3d peaks, each of which is corrected and analyzed using ESCAPAC760 (based on a correction method by J. H. Scofield), to obtain each peak area. Thus obtained area C1s is multiplied by 1.00 for C1s, by 1.77 for N1s, and by 10.68 for Ag3d, to provide each ratio of number of atoms. The number of surface bound-nitrogen atoms as against a total number of surface carbon atoms (N/C ratio) is obtained in percentage (%) as a ratio of (number of surface nitrogen atoms/number of surface carbon atoms) and the surface acid functional group amount as against a total number of surface carbon atoms, as a ratio of (number of surface silver atoms/number of surface carbon atoms).

Next, a C1s peak is separated so as to match the peak shape with a chemical shift value in each structure, to decide a peak area of carbon double-bound with nitrogen (—C+ N—), thus calculating in percentage (%) the area ratio as against the whole surface carbon.

Further, an N1s peak is separated into peaks of 400.1 eV and 402.5 eV, to decide a peak area, as quaternary nitrogen, of peaks appearing at 402.5 eV, thus calculating in percentage (%) the area ratio as against the whole surface carbon.

Figure 3:
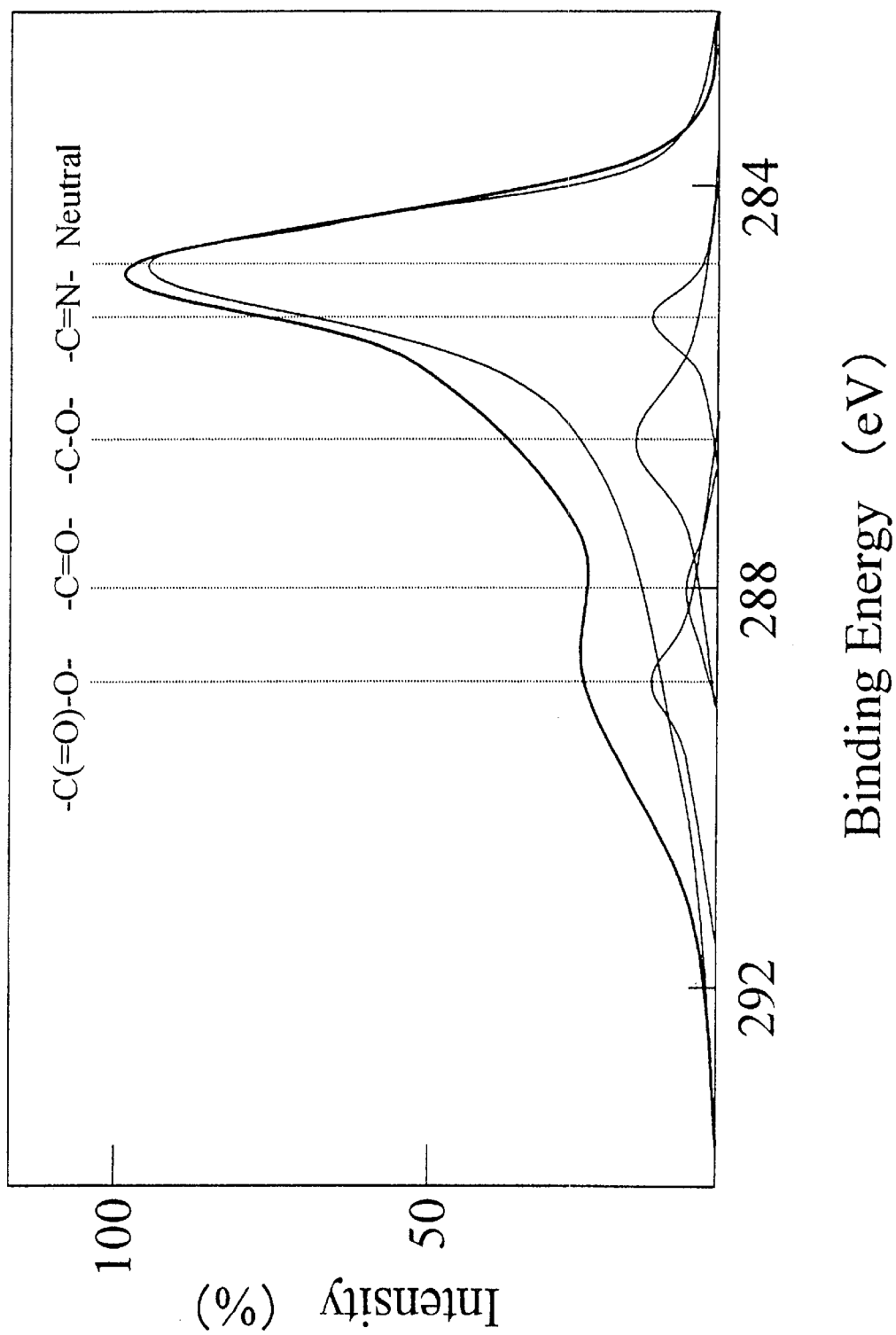
FIG. 3 is a graph showing one example of C1s-peak separation figures to each bound-structure measured with XPS surface analysis.
Figure 4:
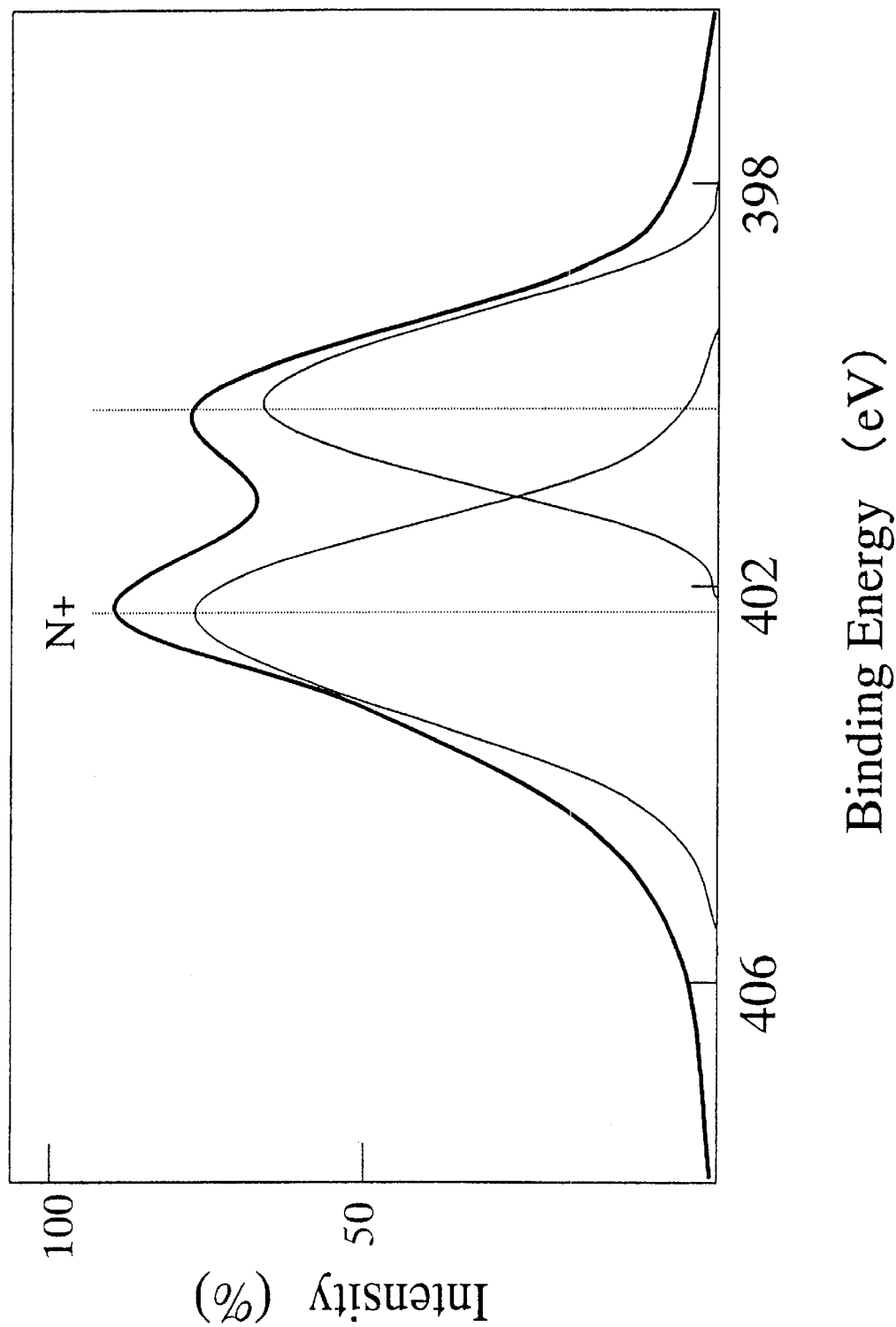
FIG. 4 is a graph showing one example of N1s-peak separation figures to each bound-structure measured with XPS surface analysis.

As the chemical shift value at the carbon peak in each structure, a literature (A. Ishitani, Carbon, 19,269 (1981)) was referenced. FIG. 3 shows an example where a measured C1s peak was separated for each of its bonding structure, while FIG. 4 shows an example where the N1s peak was separated for each of its bonding structure.

(3) Electrode Properties

A small cell is used which has an electrode area of 10 cm² (=1 cm in a vertical direction liquid flow-through direction)× 10 cm in the width direction), to repeat charge-discharge cycle at a constant current density, thus testing the electrode properties. As the positive-electrode electrolyte solution, 3 mol/l of sulfuric-acid aqueous solution of 2 mol/l vanadium oxysulfate was used and as the negative-electrode electrolyte solution, 3 mol/l of sulfuric-acid aqueous solution of 2 mol/l vanadium sulfate was used. The amount of the electrolyte solutions is set largely excessive as against the cell and the piping. A flow rate of the liquid is set at 6.2 ml/m, for measurement at 30° C. Note here that the viscosity of the above-mentioned electrolyte solutions at 25° C. was 0.006 Pa-s for the positive electrode and 0.01 Pa-s for the negative electrode.

(a) Current efficiency: ηI,

In a test during one cycle starting with charge and ending with discharge, the current density for the geometrical area of the electrode is set at 40 mA/cm² (400 mA), a charge amount required to charge up to 1.7 Vis set at $Q_1$ coulomb, and charge amounts discharged at a constant current down to 1.0 V and taken out subsequently at 1.2 V are set at $Q_2$ and $Q_3$ respectively, to obtain the current efficiency ηI using Equation 4.

$$\eta_I = \frac{Q_2 + Q_3}{Q_1} \times 100 \, (\%) \qquad \text{(Equation 4)}$$

(b) Cell resistance: R

A ratio of a charge amount taken out by discharge as against a logical charge amount $Q_{th}$ necessary to completely reduce the $V^{3+}$ in the negative-electrode solution into $V^{2+}$ is defined as a charging ratio and obtained using Equation 5.

$$(\text{charging ratio}) = \frac{Q_2 + Q_3}{Q_{th}} \times 100 \, (\%) \qquad \text{(Equation 5)}$$

A charging voltage $V_{C50}$ and a discharging voltage $V_{D50}$ which correspond to a charge amount at a charging ratio of 50% are obtained from a charge-voltage curve, to obtain a cell resistance ($\Omega \cdot cm^2$) for the electrode's geometrical area using Equation 6.

$$R = \frac{V_{C50} - V_{D50}}{2 \cdot I} \times 10 \, (\Omega \cdot cm^2) \qquad \text{(Equation 6)}$$

where, I is a current value 0.4 A at the time of charge-discharge at a constant current.

(c) Voltage efficiency: $\eta v$

Using a cell resistance R obtained above, a voltage efficiency $\eta v$ is obtained using a simple method of Equation 7.

$$\eta_V = \frac{E - I \cdot R/10}{E + I \cdot R/10} \times 100 \, (\%) \qquad \text{(Equation 7)}$$

where E is a cell's open circuit voltage 1.432 V (actual measurement) at a charging ratio of 50% and I is a current value 0.4 A at the time of charge-discharge at a constant current.

(d) Energy efficiency: $\eta E$

Using the above-mentioned current efficiency $\eta I$ and the voltage efficiency $\eta v$, an energy efficiency $\eta E$ is obtained using Equation 8.

$$\eta_E = \eta_I \times \eta_V \times \frac{1}{100} \, (\%) \qquad \text{(Equation 8)}$$

The higher the current efficiency and the voltage efficiency, the higher becomes the energy efficiency, to reduce the energy loss during charge-discharge cycles, thus deciding the electrodes to be excellent.

(e) Time-wise change of charge-discharge cycles After the items (a), (b), (c), and (d) are measured, the same cell is subsequently used to repeat charge-discharge at a constant current density of 40 mA/cm$^2$ and a cell voltage of 1.0–1.7 V. After a predetermined number of cycles elapsed, the items (a), (b), (c), and (d) are measured again, to obtain $\eta E$ and a change $\Delta \eta E$ as calculated from its initial state.

The properties of electrodes for an electrolytic cell used in redox-flow type batteries etc. are represented by the above-mentioned current efficiency $\eta I$, the voltage efficiency $\eta v$ (cell resistance R), and the energy efficiency $\eta E$ (product of $\eta I$ and $\eta v$) as well as their charge-discharge stability values (service lives) during charge-discharge cycles.

In a redox-flow type battery, in particular, the current efficiency $\eta I$ is decreased because a charged amount is partially dissipated due to side reactions such as generation of hydrogen or oxygen mainly during charging. Generally, it is observed that when metal elements are used as the electrode, each of the elements has each electrochemical reaction selectivity. Similarly, it is assumed that different crystallinities of carbon also have correspond to different electron energy levels, which have a large influence on the electrochemical reaction selectivity, i.e. current efficiency $\eta I$. The present invention makes it possible to remarkably enhance the current efficiency $\eta I$ by providing the above-mentioned carbon structure. This is assumed because the reaction selectivity based on an electron energy level of a carbon material having the above-mentioned structure is in an optimal state in a system used and also, the carbon's internal structure is made uniform (averaged) and the structural defects etc. are reduced or eliminated, thus making the electrode potential uniform. Note here that as publicly known, metal impurities, especially such transition metals as iron, chromium, and nickel act as a catalyst for promoting the side reaction, so that it is preferable to use such a carbon material that contains those impurities as less as possible.

EXAMPLE

The present invention will be explained based on examples below.

Example 1-1

After a polyacrylonitrile fiber having the average fiber diameter of 16 μm was converted into flame-resistant in an air at 200 to 300° C., a short fiber of the flame-resistant fiber (length; about 80 mm) was felted to make a non-woven fabric having basis weight of 400 g/m$^2$ and the thickness of 4.0 mm. While an argon gas was constantly blasted to the non-woven fabric at 600 cc/min./m$^2$, a temperature was raised to 1400° C., 1600° C. or 1800° C., respectively, at a temperature raising rate of 100° C./min. and a temperature was maintained at the each temperature for 1 hour to perform carbonization. Thereafter, the non-woven fabric was cooled, and treated in the nitrogen gas atmosphere having the oxygen concentration of 7% at 700° C. to yield by weight of 95% to obtain three kinds of carbonaceous fibrous non-woven fabrics.

Example 1-2

After a mesophase pitch fiber having the average fiber diameter of 13 μm was made infusible in an air at 250 to 350° C., a short fiber of the infusible fiber (length; about 80 mm) was felted to make a non-woven fabric having basis weight of 500 g/m$^2$ and the thickness of 5.5 mm. While an argon gas was constantly blasted to the non-woven fabric at 600 cc/min./m$^2$, a temperature was raised to 1200° C. at a temperature raising rate of 100° C./min. and a temperature was maintained at that temperature for 1 hour to perform carbonization. Thereafter, the non-woven fabric was cooled, and treated in the nitrogen gas atmosphere having the oxygen concentration of 7% at 700° C. to yield by weight of 95% to obtain the carbonaceous fibrous non-woven fabric.

Example 1-3

A non-woven fabric made under the same conditions as those of Example 1-1 was heated to 1400° C. at a temperature raising rate of 10° C./min. in the nirogen gas atmosphere, maintained at that temperature for 1 hour to perform carbonization, cooled, and treated in the nitrogen gas atmosphere having the oxygen concentration of 7% at 700° C. to yield by weight of 95% to obtain the carbonaceous fibrous non-woven fabric.

Example 1-4

While an argon gas was constantly blasted to a non-woven fabric made under the same conditions as those of Example 1-1 at 600 cc/min./m², it was heated to 2000° C. at a temperature raising rate of 100° C./min., maintained at that temperature for 1 hour to perform carbonization, cooled, and treated in the nitrogen gas atmosphere having the oxygen concentration of 7% at 700° C. to yield by weight of 95% to obtain the carbonaceous fibrous non-woven fabric.

Example 1-5

While an argon gas was constantly blasted to a non-woven fabric made under the same conditions as those of Example 1-1 at 600 cc/min./m², it was heated to 1600° C. at a temperature raising rate of 100° C./min., maintained at that temperature for 1 hour to perform carbonization, cooled, and treated in the nitrogen gas atmosphere having the oxygen concentration of 0.5% at 700° C. to yield by weight of 95% to obtain the carbonaceous fibrous non-woven fabric.

Example 1-6

While an argon gas was constantly blasted to a non-woven fabric made under the same conditions as those of Example 1-1 at 600 cc/min./m², it was heated to 1600° C. at a temperature raising rate of 100° C./min., maintained at that temperature for 1 hour to perform carbonization, cooled, and treated in an air at 700° C. to yield by weight of 85% to obtain the carbonaceous fibrous non-woven fabric.

Example 1-7

While a nitrogen gas was constantly blasted to a non-woven fabric made under the same conditions as those of Example 1-1 at 600 cc/min./m², it was heated to 1600° C. at a temperature raising rate of 100° C./min., maintained at that temperature for 1 hour to perform carbonization, cooled, and treated in the nitrogen gas atmosphere having the oxygen concentration of 7% to yield by weight of 95% at 900° C. to obtain the carbonaceous fibrous non-woven fabric.

The results of X-ray wide angle analysis and those of XPS surface analysis in Examples 1-1 to 1-7 are shown in Table 1. In addition, the electrode performance (2nd cycle and 100th cycle of charge and discharge cycle) as described above of the treated samples were measured at the spacer thickness of 2.0 mm and the results thereof are shown in Table 1.

TABLE 1

| | Electrode physical properties | | | | | Electrode performance | | | | |
| | X-ray wide-angle analysis | | | XPS surface analysis | | 2'nd cycle | | | 100'th cycle | |
| | $d_{002}$ (Å) | Lc (Å) | La (Å) | A*¹ (%) | B*² (%) | η1 (%) | ηv (%) | ηE (%) | ηE (%) | ΔηE*³ (%) |
|---|---|---|---|---|---|---|---|---|---|---|
| Example 1-1 | 3.49 | 21.0 | 46.0 | 1.0 | 2.5 | 99.6 | 95.0 | 94.6 | 94.5 | 0.1 |
| | 3.47 | 25.0 | 55.0 | 0.5 | 1.5 | 99.6 | 95.2 | 94.8 | 94.8 | 0.0 |
| | 3.45 | 28.0 | 62.0 | 0.2 | 0.8 | 99.5 | 94.8 | 94.3 | 94.3 | 0.0 |
| Example 1-2 | 3.49 | 26.0 | 61.0 | 0.5 | 0.0 | 99.6 | 94.9 | 94.5 | 94.4 | 0.1 |
| Example 1-3 | 3.51 | 18.5 | 40.0 | 1.0 | 2.8 | 99.5 | 93.2 | 92.7 | 92.6 | 0.1 |
| Example 1-4 | 3.43 | 33.0 | 72.0 | 0.2 | 0.4 | 99.6 | 94.7 | 94.3 | 91.3 | 3.0 |
| Example 1-5 | 3.47 | 25.0 | 55.0 | 0.1 | 1.5 | 99.6 | 92.0 | 91.6 | 91.5 | 0.1 |
| Example 1-6 | 3.47 | 25.0 | 55.0 | 1.2 | 1.7 | 99.6 | 93.8 | 93.4 | 93.3 | 0.1 |
| Example 1-7 | 3.47 | 25.0 | 55.0 | 0.5 | 3.4 | 99.6 | 93.3 | 92.9 | 91.2 | 1.7 |

*¹Column A indicates a value in percentage of a surface acidic functional group amount as against a total number of surface carbon atoms.
*²Column B indicates a value in percentage of a number of surface bound-nitrogen atoms as against a total number of surface carbon atoms.
*³ΔηE indicates a decrease in value of ηE observed from the second cycle to the 100'th cycle.

Example 2-1

A polyacrylonitrile fiber having the average fiber diameter of 16 μm was converted into flame-resistant at 200 to 300° C. in an air, a short fiber(length; about 80 mm) of the flame-resistant fiber was felted to make a non-woven fabric having basis weight of 400 g/m² and the thickness of 4.0 mm. The non-woven fabric was soaked in a 0.01 wt % aqueous bismuth hydroxide solution, dehydraded (0.008 wt % attachment in terms of bismuth ion), heated to 2000° C. in the nitrogen gas at a temperature raising rate of 10° C./min., maintained at that temperature for 1 hour to perform carbonization, cooled, and oxidizing-treated to yield by weight of 93% at 650° C. in an air to obtain the carbonaceous fibrous non-woven fabric.

Example 2-2

A non-woven fabric made under the same conditions as those of Example 2-1 was soaked in a 0.01 wt % aluminum hydroxide solution, dehydraded (0.06 wt % attachment in terms of aluminum ion), heated to 1600° C. at a temperature raising rate of 10° C./min. in the nitrogen gas, maintained at this temperature for 1 hour to perform carbonization, cooled, and oxidizing-treated to yield by weight of 93% at 650° C. in an air to obtain the carbonaceous fiburous non-woven fabric.

Example 2-3

A non-woven fabric made under the same conditions as those of Example 2-1 was heated to 1300° C. at a temperature raising rate of 10° C./min. in the nitrogen gas, maintain at this temperature for 1 hour to perform carbonization, cooled, and oxidizing-treated to yield by weight of 93% at 650° C. in an air to obtain the carbonaceous fibrous non-woven fabric.

Example 2-4

A non-woven fabric made under the same conditions as those of Example 2-1 was heated to 2000° C. at a temperature raising rate of 10° C./min. in the nitrogen gas, maintained at this temperature for 1 hour to perform carbonization, cooled, and oxidizing-treated to yield by weight of 93% at 650° C. in an air to obtain the carbonaceous fibrous non-woven fabric.

The results of laser Raman analysis, XPS surface analysis, and specific resistance in Examples 2-1 to 2-4 are shown in Table 2. Specific resistance of a single fiber was measured according to "6.7 volumetric resistance" described in JIS R7601 (1986). The electrode performance (2nd cycle and 100th cycle of charge and discharge cycle) of the treated sample was measured at a spacer thickness of 2.0 mm and the results thereof are shown in Table 2.

ture raising rate of 10° C./min. in the nitrogen gas, maintained at this temperature for 1 hour to perform carbonization, cooled, and treated to yield by weight of 93% at 700° C. under the nitrogen stream having the oxygen concentration of 7 vol % to obtain the carbonaceous fibrous non-woven fabric.

Example 3-4

While an argon gas was constantly blasted to a non-woven fabric made under the same conditions as those of Example 3-1 at 600 cc/min./m², heated to 2000° C. at a temperature raising rate of 10° C./min., maintained at this temperature

TABLE 2

| | Electrode physical properties | | | | Fiber physical properties | | | | | |
|---|---|---|---|---|---|---|---|---|---|---|
| | Laser Raman analysis | | | | | | | | | |
| | Half-value, half-width of peak of | Half-value, half-width of peak of | | XPS surface analysis | Initial state Specific | 100'th cycle Specific | Electrode performance | | | |
| | | | | | | | 2'nd cycle | | 100'th cycle | |
| | 1360 cm⁻¹ (cm⁻¹) | 1580 cm⁻¹ (cm⁻¹) | Ia/Ig*¹ (−) | A*² (%) | resistance (Ω · cm) | resistance (Ω · cm) | η1 (%) | ηV (%) | ηE (%) | ηE (%) | ΔηE*³ (%) |
| Example 2-1 | 30 | 31 | 0.7 | 0.4 | 0.005 | 0.005 | 99.5 | 94.5 | 94.0 | 93.9 | 0.1 |
| Example 2-2 | 39 | 36 | 0.8 | 0.5 | 0.006 | 0.006 | 99.5 | 94.7 | 94.2 | 94.2 | 0.0 |
| Example 2-3 | 71 | 50 | 1.1 | 1.0 | 0.010 | 0.015 | 99.2 | 91.0 | 90.3 | 88.0 | 2.3 |
| Example 2-4 | 21 | 24 | 0.5 | 0.1 | 0.005 | 0.011 | 99.6 | 88.2 | 87.8 | 84.9 | 2.9 |

*¹Column Ia/Ig indicates a value of 1360 cm⁻¹ peak intensity Ia divided by 1580 cm⁻¹ peak intensity Ig.
*²Column A indicates a value in percentage of a surface acidic functional group amount as against a total nmnber of surface carbon atoms
³ΔηE indicates a decrease in value of ηE observed from the second cycle to the 100'th cycle.

Example 3-1

A polyacrylonitrile fiber of the average fiber diameter of 16 μm was converted into flame-resistant in an air at 200 to 300° C., a short fiber (length; about 80 mm) of the flame-resistant fiber was felted to make a non-woven fabric having basis weight of 400 g/m² and the thickness of 4.0 mm. While an argon gas was constantly blasted to the non-woven fabric at 600 cc/min./m², the non-woven fabric was heated to 1600° C. at a temperature raising rate of 100° C./min., maintained at this temperature for 1 hour to perform carbonization, cooled, and treated to yield by weight of 93% at 700° C. in the nitrogen stream of the oxygen concentration of 0.5 vol %. Further, non-woven fabric was activated at 500° C. for 10 minutes in the nitrogen stream containing 20 vol % water steam to obtain the carbonaceous fibrous non-woven fabric.

Example 3-2

While an argon gas was constantly blasted to a non-woven fabric made under the same conditions as those of Example 3-1 at 600 cc/min./m², the non-woven fabric was heated to 1600° C. at a temperature raising rate of 100° C./min., maintained at this temperature for 1 hour to perform carbonization, cooled, and treated to yield by weight of 93% at 700° C. under the nitrogen stream having the oxygen concentration of 0.5 vol %. Further, the non-woven fabric was activated at 200° C. for 5 minutes under the nitrogen stream containing 5 vol % hydrogen chloride gas and 20 vol % water steam to obtain the carbonaceous fibrous non-woven fabric.

Example 3-3

A non-woven fabric made under the same conditions as those of Example 3-1 was heated to 1200° C. at a temperafor 1 hour to perform carbonization, cooled, and treated to yield by weight of 93% at 700° C. under the nitrogen stream having the oxygen concentration of 7 vol %. Further, the non-woven fabric was activated at 500° C. for 10 minutes under the nitrogen stream containing 20 vol % water stream to obtain the carbonaceous fibrous non-woven fabric.

Example 3-5

While an argon gas was constantly basted to a non-woven fabric made under the same conditions as those of Example 3-1 at 600 cc/min./m², the non-woven fabric was heated to 1600° C. at a temperature raising rate of 10° C./min., maintained at this temperature for 1 hour to perform carbonization, cooled, and treated to yield by weight of 93% at 700° C. under the nitrogen gas atmosphere having the oxygen concentration of 0.5 vol %. Further, the non-woven fabric was activated at 200° C. for 5 minutes under the nitrogen stream containing 5 vol % hydrogen chloride gas and 20 vol % water steam to obtain the carbonaceous fibrous non-woven fabric.

The results of XPS surface analysis and initial contact resistance and contact resistance after 100 cycles for the non-woven fabrics obtained in Examples 3-1 to 3-5 are shown in Table 3.

Initial contact resistance was measured by cutting a sample into 1 cm×10 cm size, compressing the sample to the predetermined spacer thickness with two conducting plates from the thickness direction using a teflon spacer having the thickness of 2.5 mm and measuring the resistances at both size of the conducting plate with digital multimeter (TR6846 manufactured by Advantest). In addition, contact resistance after 100 cycles was measured by making a small cell having an electrode area 10 cm² of 1 cm in an up and down direction (solution flow direction) and 10 cm in a width direction, repeating 100 cycles charge and discharge at constant current density, after completion, washing a sample used for a cathode, drying, and measuring contact resistance according an initial contact resistance measuring method.

TABLE 3

|  | XPS surface analysis value | | | Contact resistance (Ω) | |
| --- | --- | --- | --- | --- | --- |
|  | A | B | C | Initial state | 100'th cycle |
| Example 3-1 | 0.5 | 0.0 | 1.7 | 0.025 | 0.027 |
| Example 3-2 | 0.8 | 0.6 | 1.8 | 0.026 | 0.029 |
| Example 3-3 | 1.2 | 0.0 | 3.3 | 0.026 | 0.035 |
| Example 3-4 | 0.3 | 0.0 | 0.1 | 0.025 | 0.036 |
| Example 3-5 | 2.1 | 1.2 | 1.8 | 0.033 | 0.045 |

A: value in percentage of a surface acidic functional group amount as against a total number of surface carbon atoms obtained with XPS surface analysis.
B: value in percentage of a number of surface quaternary ammonium nitrogen atoms as against a total number of surface carbon atoms obtained with XPS surface analysis.
C: value in percentage of a number of surface carbon atoms double-bound with nitrogen as against a total number of surface carbon atoms obtained with XPS surface analysis.

Example 4-1

A polyacrylonitrile fiber having the average fabric diameter of 16 µm was converted into flame-resistant in an air at 200 to 300° C., a short fiber (length; about 80 mm) of the flame-resistant fiber was felted to make a non-woven fabric having basis weight of 400 g/m² and the thickness of 4.0 mm. The non-woven fabric was heated to 1200° C. at a temperature raising rate of 100° C./min. under the nitrogen stream, maintained at this temperature for 1 hour to perform carbonization, cooled, and treated to yield by weight of 93% at 700° C. in an air to obtain the carbonaceous fibrous non-woven fabric. This sample was placed in an argon gas atmospheric furnace containing 15 vol % hydrogen gas, heated at a temperature raising rate of 600° C./h, heat-treated for 5 minutes, and cooled gradually to obtain a reduced-type carbonaceous fibrous non-woven fabric.

Example 4-2

A non-woven fabric made under the same conditions as those of Example 4-1 was heated to 1400° C. at a temperature raising rate of 100° C./min. under the nitrogen stream, maintained at this temperature for 1 hour to perform carbonization, cooled, and treated to yield by weight of 93% at 550° C. in an air to obtain the carbonaceous fibrous non-woven fabric.

Example 4-3

A sample made in Example 4-2 was placed into an argon gas atmospheric furnace containing 15 vol % hydrogen gas, heated at a temperature raising rate of 600° C./h, heat-treated at 700° C. for 5 minutes, and cooled gradually to obtain a reduced-type carbonaceous fibrous non-woven fabric.

Example 4-4

A non-woven fabric made under the same conditions as those of Example 4-1 was heated to 1200° C. at a temperature raising rate of 100° C./min. under the nitrogen stream, maintained at this temperature for 1 hour to perform carbonization, cooled, and treated to yield by weight of 98% at 700° C. in an air to obtain the carbonaceous fibrous non-woven fabric.

The results of XPS surface analysis and initial contact resistance and contact resistance after 100 cycles for the non-woven fabrics obtained in Examples 4-1 to 4-4 are shown in Table 4.

TABLE 4

|  | XPS surface analysis value | | Contact resistance (Ω) | |
| --- | --- | --- | --- | --- |
|  | A | B | Initial state | 100'th cycle |
| Example 4-1 | 0.8 | 88.0 | 0.026 | 0.027 |
| Example 4-2 | 0.8 | 77.0 | 0.039 | 0.048 |
| Example 4-3 | 0.4 | 82.0 | 0.025 | 0.027 |
| Example 4-4 | 0.3 | 98.0 | 0.023 | 0.045 |

A: ratio of oxygen containing surface acid functional group/surface carbon evaluated with XPS
B: ratio of neutral surface carbon/surface carbon evaluated with XPS

Example 5-1

A polyacrylonitrile fiber, composed of acrylonitrile 98 mole %-methyl methacrylate 2 mole %, having weight average molecular weight of 75000 and average fiber diameter of 16 µm was converted into flame-resistant in an air at 200 to 300° C., and a short fiber (length; about 80 mm) of the flame-resistant fiber was felted with a felting needle SB#36 (Foster Needle Company) at a punching density of 250/cm² to make a non-woven fabric having basis weight of 600 g/m² and the thickness of 5.0 mm. While an argon gas was constantly blasted to the non-woven fabric at 600 cc/min./m², the non-woven fabric was heated to 1400° C. at a temperature raising rate of 100° C./min., maintained at this temperature for 1 hour to perform carbonization, cooled, and treated by stretching with 0.1 kgf/cm width tension at 700° C. in an air to yield by weight of 93% to obtain the carbonaceous fibrous non-woven fabric.

Example 5-2

A polyacrylonitrile fiber, composed of acrylonitrile 97 mole %-vinyl acetate 3 mole %, having weight average molecular weight of 200000 and average fiber diameter of 16 µm was converted into flame-resistant in an air at 200 to 300° C. According to the same manner as that of Example 5-1 except that a short fiber (length; about 80 mm) of this flame-resistant fiber was used, a non-woven fabric was made and treated to obtain the carbonaceous fibrous non-woven fabric.

Example 5-3

According to the same manner as that of Example 5-1 except that a punching density was 150/cm², a carbonaceous fibrous non-woven fabric was obtained.

Example 5-4

According to the same manner as that of Example 5-1 except that a punching density was 350/cm², a carbonaceous fibrous non-woven fabric was obtained.

Example 5-5

According to the same manner as that of Example 5-1 except that a non-woven fabric was treated to yield by weight of 93% at 700° C. in an air without applying tension, a carbonaceous fibrous non-woven fabric was obtained.

Size (La) of a crystallite in a axial direction of the carbonaceous fibrous non-woven fabric obtained above, XPS surface analysis, compressibility and compression modulus of the non-woven fabric, contact resistance with a current collecting plate, and electrode performance are shown in Table 5 together with the manufacturing conditions. In addition, contact resistance with a current collecting plate was measured as follows: A sample of a carbonaceous fibrous non-woven fabric having the width of 1 cm and the length of 10 cm was put between two current collecting plates, and contact when compressed to the thickness of 2 mm was conveniently measured with a digital multimeter to obtain resistance per unit area. A resin binding graphite plate (thickness;3 mm) having specific resistance of 0.05 Ω·cm was used for the current collecting plate, and resistance when the current collecting plates are mutually contacted by pressure can be negligible compared with the contact resistance with the non-woven fabric.

of 100° C./min. under the nitrogen stream, maintained at this temperature for 1 hour to perform carbonization, cooled, and treated to yield by weight of 93% at 700° C. in an air. Further, the non-woven fabric was placed into an argon gas atmospheric furnace containing 15 vol % hydrogen gas, heated at a temperature raising rate of 600° C./h, heat-treated at 700° C. for 5 minutes, and cooled gradually to obtain a reduced-type carbonaceous fibrous non-woven fabric.

Example 6-3

A polyacrylonitrile fiber having the average fiber diameter of 16 μm was converted into flame-resistant in an air at 200 to 300° C., and cut into 80 mm in length to make a short fiber of a flame-resistant fiber. To this was added 0.5% by weight of phenol resin powder (trade name Bellpearl S890, manu-

TABLE 5

| | Manufacturing conditions | | | Material physical properties | | Non-woven fabric physical properties | | Non-woven fabric properties | Electrode performance 2'nd cycle | | |
|---|---|---|---|---|---|---|---|---|---|---|---|
| | | | | X-ray | XPS | Compression | | Initial state | | | |
| | Weight- average molecular weight | Punching density (pieces/ cm²) | Tension at time of oxidization (kgf/cm) | wide-angle analysis La (Å) | surface analysis A*¹ (%) | properties Compressibility (%) | Compression modulus (%) | Contact resistance with collector plate (Ω · cm²) | ηI (%) | ηV (%) | ηE (%) |
| Example 5-1 | 75000 | 250 | 0.1 | 43.1 | 0.8 | 14 | 90 | 0.20 | 99.7 | 95.0 | 94.7 |
| Example 5-2 | 200000 | 250 | 0.1 | 52.6 | 0.6 | 12 | 91 | 0.19 | 99.6 | 95.2 | 94.8 |
| Example 5-3 | 75000 | 150 | 0.1 | 43.1 | 0.8 | 27 | 77 | 0.36 | 99.7 | 89.6 | 89.3 |
| Example 5-4 | 75000 | 350 | 0.1 | 43.1 | 0.8 | 20 | 75 | 0.39 | 99.7 | 88.2 | 87.9 |
| Example 5-5 | 75000 | 250 | 0 | 43.1 | 0.8 | 28 | 72 | 0.41 | 99.7 | 86.0 | 85.7 |

*¹Column A indicates a value in percentage of a surface acid functional group amount as against a total number of surface carbon atoms.

Example 6-1

A polyacrylonitrile having the average fiber diameter of 16 μm was converted into flame-resistant in an air at 200 to 300° C., and cut into about 80 mm in length to make a short fiber of a flame-resistant fiber. This was made into a non-woven fabric under the conditions of a needle of #HDB40 manufactured by Foster Company, needle density of 470/inch², depth of 8 mm and pushing gap of 4 mm to make a non-woven fabric having basis weight of 400 g/m² and the thickness of 4.3 mm. Then, the non-woven fabric was heated to 1200° C. at a temperature raising rate of 100° C./min. under the nitrogen stream, maintained at this temperature for 1 hour to perform carbonization, cooled, and treated to yield by weight of 93% at 700° C. in an air. Further, the non-woven fabric was placed into an argon gas atmospheric furnace containing 15 vol % hydrogen gas, heated at a temperature raising rate of 600° C./h, heat-treated at 700° C. for 5 minutes, cooled gradually to obtain a reduced-type carbonaceous fibrous non-woven fiber.

Example 6-2

A polyacrylonitrile fiber having the average fiber diameter of 16 μm was converted into flame-resistant in an air at 200 to 300° C., and cut into about 80 mm in length to make a short fiber of a flame-resistant fiber. This was made into a non-woven fabric under the conditions of a needle of #HDB40 manufactured by Foster Company, needle density of 146/inch², depth of 4 mm and pushing gap of 4 mm to make a non-woven fabric having basis weight of 400 g/m² and the thickness of 5.2 mm. Then, the non-woven fabric was passed through a calendar roll at line pressure of 60 kg/cm to press to the thickness of 3.1 mm. The non-woven fabric was heated to 1200° C. at a temperature raising rate factured by Kanebo (K.K.)), relative to the weight of the flame-resistant fiber to mix, which was made into a non-woven fabric under the conditions of a needle of #HDB40 manufactured by Foster Company, needle density of 146/inch², depth of 4 mm and pushing gap of 4 mm to make a non-woven fabric having basis weight of 400 g/m² and the thickness of 5.2 mm. Then, the non-woven fabric was passed through a calendar roll at line pressure of 60 kg/cm and 200° C. to press to the thickness of 2.0 mm. The non-woven fabric was heated to 1200° C. at a temperature raising rate of 100° C./min. under the nitrogen stream, maintained at this temperature for 1 hour to perform carbonization, cooled, and treated to yield by weight of 93% at 700° C. in an air. Further, the non-woven fabric was placed into an argon gas atmospheric furnace containing 15 vol % hydrogen gas, heated at a temperature raising rate of 600° C./h, and heat-treated at 700° C. for 5 minutes, and cooled gradually to obtain a reduced-type carbonaceous fibrous non-woven fabric.

Example 6-4

According to the same manner as that of Example 6-2 except that a non-woven fabric was not pressed by passing through a calendar roll at line pressure of 60 kg/cm and 240° C., a reduced-type carbonaceous fibrous non-woven fabric was obtained.

Example 6-5

According to the same manner as that of Example 6-2 except that a short fiber was made into a non-woven fabric by adding 0.5% by weight of phenol resin powder (trade name Bellpearl S890, manufactured by Kanebo (K.K.)), relative to the weight of the flame-resistant fiber, a reduced-type carbonaceous fibrous fabric was obtained.

Bulk density, XPS surface analysis, liquid flow pressure loss, initial contact resistance with a current collecting plate, and contact resistance after 100 cycles for the carbonaceous fibrous non-woven fabrics obtained above are shown in Table 6 together with the manufacturing conditions. Liquid flow pressure loss was measured as follows: a liquid flowing-type electrolysis tank, composed of 20 cm in a liquid flow direction, 10 cm in width direction (path width) and a 1.2 mm spacer, having the same shape as that of a liquid flowing-type electrolysis tank was prepared, and an electrode material made (carbonaceous fibrous non-woven fabric) was cut into 10 cm×10 cm and arranged. Ion-exchanged water was flown at a liquid amount of 5 liter/h and liquid flow pressure losses between outlet and inlet of an electrolysis tank were measured. The similar measurement was carried out without arrangement of the electrode material as a blank and a difference between the measured value and the blank measured value was adopted as solution conducting pressure loss of an electrode material.

to 60 cm$^{-1}$, a half value half width of a peak at 1580 cm$^{-1}$ is 30 to 45 cm$^{-1}$, and a ratio R of peak intensity Ia at 1360 cm$^{-1}$ and peak intensity Ig at 1580 cm$^{-1}$ (=Ia/Ig) is 0.7 to 1.0 each obtained by a laser Raman spectroscopic method.

5. The carbon electrode material according to claim 1, wherein a stacked structure ratio based on a peak intensity of <002> diffraction obtained by X-ray wide angle analysis is 0.50 to 0.90.

6. The carbon electrode material according to claim 1, wherein number of surface carbon atoms which are double-bound with nitrogen obtained by XPS surface analysis is 0.3 to 3.0% relative to total number of surface carbon atoms.

7. The carbon electrode material according to claim 6, wherein number of surface quaternary ammonium nitrogen atoms obtained by XPS surface analysis is 1.0% or smaller relative to total number of surface carbon atoms.

8. The carbon electrode material according to claim 1, wherein number of surface neutral carbon atoms obtained by XPS surface analysis is 80 to 95% relative to total number of surface carbon atoms.

TABLE 6

| | Material non-woven fabric manufacturing conditions | | | | Product | | | | | | Liquid flow | Contact resistance (Ω) | |
|---|---|---|---|---|---|---|---|---|---|---|---|---|---|
| | Needle density (pieces/inch$^2$) | Needle depth (mm) | Binder | Press | Thickness (mm) | Basis weight (g/cm$^2$) | Thickness (mm) | Bulk density (g/cm$^3$) | XPS surface analysis | | pressure loss (mmHg) | Initial state | 100'th cycle |
| | | | | | | | | | A*$^1$ | B*$^2$ C*$^3$ | | | |
| Example 6-1 | 470 | 8 | | | 4.3 | 221 | 3.6 | 0.061 | 0.5 | 0  1.7 | 124 | 0.018 | 0.020 |
| Example 6-2 | 146 | 4 | | 240° C. | 3.1 | 231 | 2.8 | 0.083 | 0.5 | 0  1.7 | 134 | 0.014 | 0.016 |
| Example 6-3 | 146 | 4 | S890 | 200° C. | 2.0 | 227 | 1.6 | 0.142 | 0.5 | 0  1.7 | 137 | 0.013 | 0.015 |
| Example 6-4 | 146 | 4 | | | 5.2 | 234 | 5.0 | 0.047 | 0.5 | 0  1.7 | 101 | 0.028 | 0.031 |
| Example 6-5 | 146 | 4 | S890 | 240° C. | 1.2 | 228 | 1.2 | 0.190 | 0.5 | 0  1.7 | 161 | 0.012 | 0.014 |

*$^1$Column A indicates a value in percentage of a surface acid functional group amount as against a total number of surface carbon atoms.
*$^2$Column B indicates a value in percentage of a number of surface quaternary ammoniac nitrogen atoms as against a total number of surface carbon atoms.
*$^3$Column C indicates a value in percentage of a number of surface carbon atoms double-bound with nitrogen as against a total number of surface carbon atoms.

What is claimed is:

1. A carbon electrode material for a vanadium-based redox-flow battery, comprising quasi-graphite crystal structure, wherein <002> spacing is 3.45 to 3.50 Å, size of a crystallite in c axial direction is 20 to 30 Å, and size of a crystallite in a axial direction is 30 to 70 Å, each obtained by X-ray wide angle analysis, and having surface property obtained by XPS surface analysis wherein an amount of surface acidic functional groups is 0.1 to 1.2% relative to total number of surface carbon atoms and number of surface bound-nitrogen atoms is 5% or smaller relative to total number of surface carbon atoms, and wherein the carbon electrode material is formed into a non-woven fabric of a carbonaceous fiber, and the non-woven fabric has a bulk density of 0.05 to 0.17 g/cm$^3$.

2. The carbon electrode material according to claim 1, wherein said amount of surface acidic functional groups is 0.2 to 1.0% relative to total number of surface carbon atoms and said number of surface bound-nitrogen atoms is 3% or smaller relative to total number of surface carbon atoms.

3. The carbon electrode material according to claim 1, wherein said <002> spacing is 3.45 to 3.50 Å, said size of a crystallite in c axial direction is 20 to 30 Å and said size of a crystallite in a axial direction is 45 to 65 Å.

4. The carbon electrode material according to claim 1, wherein a half value half width of a peak at 1360 cm$^{-1}$ is 30

9. The carbon electrode material according to claim 1, wherein the viscosity of an electrolysis solution of the battery is 0.005 Pa·s or greater at 25° C.

10. The carbon electrode material according to claim 1, wherein an electrolysis solution of the battery contains vanadium ion at an amount of 1.5 mol/l.

11. The carbon electrode material according to claim 1, wherein the carbon electrode material is formed into a non-woven fabric of a carbonaceous fiber, the non-woven fabric has compressibility of 10 to 25% and compression modulus of 80% or greater each obtained according to JIS L1096 (1990).

12. The carbon electrode material according to claim 11, said non-woven fabric has one or more concave groove formed on one face thereof.

13. The carbon electrode material according to claim 1, said non-woven fabric has one or more concave groove formed on one face thereof.

14. A battery comprising an ion exchange membrane, a pair of the carbon electrode material of claim 1, and collector plates in contact with the carbon electrode material, wherein one member of the electrode material pair is disposed on each side of the ion exchange membrane.

* * * * *